United States Patent [19]
Edgar

[11] Patent Number: 5,627,588
[45] Date of Patent: May 6, 1997

[54] VIDEO SIGNAL PROCESSING STRIPE COLOR DEMODULATOR SYSTEM AND METHOD

[75] Inventor: Albert D. Edgar, Travis, Tex.

[73] Assignee: International Business Machines Corporation, Armonk, N.Y.

[21] Appl. No.: 413,339

[22] Filed: Mar. 30, 1995

[51] Int. Cl.$^6$ ............... H04N 5/228; H04N 9/07
[52] U.S. Cl. ............... 348/222; 348/266; 348/237; 348/641
[58] Field of Search ............... 348/222, 234, 348/237, 266, 727, 659, 256, 652, 641, 649, 653, 654; 345/154; H04N 5/228, 9/07, 9/68, 5/455

[56] References Cited

U.S. PATENT DOCUMENTS

| | | |
|---|---|---|
| 3,663,745 | 5/1972 | O'Toole . |
| 4,041,528 | 8/1977 | Miyoshi et al. . |
| 4,277,801 | 7/1981 | Rhodes . |
| 4,388,640 | 6/1983 | Rhodes . |
| 4,500,910 | 2/1985 | Harwood ............... 348/659 |
| 4,503,454 | 3/1985 | Lewis, Jr. . |
| 4,573,068 | 2/1986 | Dorsey et al. . |
| 4,594,607 | 6/1986 | Lewis, Jr. et al. . |
| 4,680,546 | 7/1987 | Dumoulin . |
| 4,703,349 | 10/1987 | Bernstein . |
| 4,799,142 | 10/1988 | Freeman et al. . |
| 4,831,463 | 5/1989 | Faroudja . |
| 4,991,092 | 2/1991 | Greensite . |
| 5,136,370 | 8/1992 | Chi . |
| 5,140,408 | 8/1992 | Kaite et al. . |
| 5,142,286 | 8/1992 | Ribner et al. . |

FOREIGN PATENT DOCUMENTS 3-70292  3/1991  Japan .

*Primary Examiner*—Sherrie Hsia
*Attorney, Agent, or Firm*—Robert M. Carwell

[57] ABSTRACT

An image is captured into a video signal by an array sensor with color stripes. The system first interprets the highest frequencies of the signal as an upper sideband of the I color component so as to double the recoverable bandwidth of color detail. From the upper sideband of the signal, the corresponding lower color sideband is predicted and its effect is then subtracted from the luminance component, from which, in turn, an image is generated. The resulting image is enhanced in sharpness and has fewer artifacts. Color may be demodulated from sensor signal and the predominant I color vector demodulated from the color carrier utilizing an asymmetric sideband filter.

44 Claims, 4 Drawing Sheets

VIDEO SIGNAL PROCESSING STRIPE COLOR DEMODULATOR SYSTEM AND METHOD

FIELD OF THE INVENTION

This invention relates to video signal processing and, more particularly, to recovery of a full color image from the output of a sensor under a color filter mosaic.

BACKGROUND OF THE INVENTION

There are several ways to sense a full color image. For example red, green, and blue images may be captured sequentially using different filters as is done in many scanners. Alternatively, white light may be focused by a lens and split into three color images. Each image is then sensed by a different sensor, as in "3-chip" cameras. The method that relates to the present invention uses a single sensor array of multiple pixels with a repetitive mosaic of colored filters placed so as to shadow each pixel with a single color. This is the method used in the great majority of video and digital cameras. One reason is that it provides for simultaneous capture of three colors for moving objects at the lowest cost by utilizing only a single sensor. This method is in fact the method used by the human eye to detect color. An example of such a sensor array is manufactured by Sony Corporation To describe this single sensor array method in more detail, FIG. 1 depicts an array of pixels 102 comprising a sensor. A single row of these pixels 104 group into a scan line "Y". When an image is read from the array, the pixels in such a scan line are read sequentially along the scan line. The mosaic consists of columns of colors arranged in stripes of red 202, green 204, and blue 206. Such a mosaic is called a striped color array. When pixels are read sequentially from the scan line 104, a repetitive sequence 105 of red, green, and blue pixels are read.

With any mosaic of colored filters over a single sensor, color is in effect coded into a pattern set by the mosaic. For example, if in the case of the striped color array, every third column was bright, it would be a good guess that the scene had a single bright color. Another less likely, but not impossible guess, is that the scene contained closely spaced vertical lines. Particularly in scenes with both detail and color, patterns arise in the sensed image that can be interpreted as either color or image detail. A color decoding algorithm must attribute each pattern to either the color or image detail. If the wrong choice is made, artifacts arise, such as the shimmering colors in a referee's shirt as seen on an NTSC television reception.

To better understand the decoding of color from a striped color array, the problem is now presented in the frequency domain. FIG. 3 again depicts a striped color array 302 placed over a pixel array. As a row of pixels is read from the array, a pattern is read corresponding to the color of the image the array is viewing. For example, if the scene is bright green, then the sensors under the green stripes 304 will cause the output 306 from a row of pixels to have repetitive peaks 308 at a frequency corresponding to every third pixel. If the scene was bright blue instead, then the blue stripes 310 will cause the output 312 to have similarly spaced but differently placed peaks 314. So the presence of a bright color is sensed by the presence of a particular frequency, and the hue of that color is sensed by the phase of that frequency.

For this invention, let the frequency of a pure color (as represented for example, by signals 306 and 312 of FIG. 3, and hereinafter referred to as the color carrier) arbitrarily be assigned a frequency of 1.0. Then it follows that the pixel array itself has three pixels for each color cycle, and therefore samples at a frequency of 3.0. The Nyquist frequency of the pixel array, which is the maximum sensed frequency at which alternate pixels are light and dark, is half of 3.0, or 1.5, and the Nyquist frequency of a pure color is half of 1.0, or 0.5.

FIG. 4 depicts a sequence 402, of red, green, and blue stripes, 408 (which upon repeating connects again with red 410). Although these colors lie along a row 404, the repetitive nature lets them be thought of as representing a color circle 406. FIG. 5 expands this circle and shows how the colors can be represented by vectors around this circle. A green scene, for example, would stimulate peak response as the circle passed over the head of the green vector, 502. Any hue can be represented as a vector direction around this circle. Two hues of particular interest are the "I" vector, 504, which represents the "Inphase" component of NTSC television, and "Q" vector, 506, which represents the "Quadrature" phase of NTSC. The I vector was selected to match the most common hue direction of colors in the real world, which is the orange-blue hue axis, and the Q vector is the least common direction, which is the green-magenta hue axis.

With reference to FIG. 6, the effect of color striping is now portrayed in the frequency domain. In order to take advantage of this portrayal, colors are represented as consisting of a luminance, commonly called a "Y" component, 602, and two color components, the component, 604, and the "Q" component, 610, presented earlier.

A purely luminance, or black and white scene, will pass all the color filters equally, and so will stimulate an effect from a scan line equivalent to having no filters in place at all. This is represented in FIG. 6 as the Y curve 602 having spatial frequency content determined by the scene, attenuated by blurring in the sensor and associated optics, and limited by the raw Nyquist of the sensor array to a frequency of 1.5 in units of the color carrier, as defined earlier.

The color components arise from the same image edges as the luminance component, and so typically exhibit a spatial frequency shape very similar to the luminance component, however with reduced magnitude. In particular, all color, including the I component is typically much lower than the Y component, and hence the I component curve 604 has the same shape as the Y component curve 602, but is much lower. In addition, because color is effectively multiplied by, or modulated by, the color stripes, it appears to peak at the color carrier frequency of 1.0, and has an upper sideband 606 extending above 1.0 and a mirror image lower sideband 608 extending down. The Q signal is lower than the I in most cases because the I and Q vector directions were chosen in order to maximize this difference in magnitude for an average of scenes. The difference is usually quite large, as illustrated in FIG. 6 wherein the Q curve 610 is much lower than the I curve, 604. It is noted that the I and Q curves occupy the same frequency space centered at the color carrier, 612. However because both have two sidebands, they may be distinguished by phase. The two color components I and Q also overlap frequencies with the luminance Y component, 602. This overlap is the origin of artifacts in a single sensor color method. The prior art has attempted imperfect separation, and it is the intent of this invention to better separate the components.

The signal derived from a single sensor array under a color matrix has in effect a color signal coded into the signal that must be decoded to provide a useful color image. A basic technique in the art to provide this decoding into separate color components dividing each scan line 104 of FIG. 2 into three scan lines, represented by scan lines YR 208, YG 210, and YB 212. Because each of these scan lines consist of only pixels of like color, and so have only one-third as many pixels as the original scan line, each is limited to a Nyquist frequency of 0.5, as described above.

There were several drawbacks to this approach. The most obvious is that for black and white detail, the effective resolution of the array was limited to one-third as many pixels as physically contained in the array. In addition, any optical detail that passed beyond the low Nyquist frequency of 0.5 aliased into artifacts, giving the common effect in early digital cameras of one red eye and one blue eye.

Yet another possible approach in the prior art opposite to that just described assumed that images were essentially purely black and white. This assumption, of course, is valid, for example, when text printed on white paper with black ink is scanned. Under this assumption, the colored stripes have no effect. Accordingly, the full bandwidth of 1.5 (e.g., half of the array sampling frequency of 3.0) is filled. This results in a bandwidth of three times that of the previously described first technique, but in its pure form requires that the scene have no color detail at all because all frequencies are decoded under the assumption they arise from luminance detail.

The two prior art techniques just described suggested that there was a limited amount of information that could be allocated between three colors with 0.5 bandwidth each, or on a monochrome signal with 1.5 bandwidth, or any combination. A good compromise in the prior art was to allocate 0.75 bandwidth to the luminance, and 0.25 bandwidth to the color. It may be noted in FIG. 6 that at a frequency of 0.75 (which is 0.25 down from the color carrier at 1.0, 612) the luminance and color components are about equal magnitude. Hence statistically this is the optimum watershed frequency below which signal is interpreted as luminance and above which it is interpreted as color.

It is noted that by allocating less bandwidth to color, the highest frequencies from the array in the vicinity of 1.5 are not allocated to any channel, but are lost. In addition, if at the separating frequency of 0.75 half the information is from color and half from luminance, then half will cross over that "watershed" frequency into the wrong interpretation and produce artifacts.

Yet a third technique employed a median filter to estimate edge positions and achieve wider bandwidth for edges. A commercial realization of this system produced a bandwidth of exactly 0.75. However, because this was a non-linear technique, significant undesirable artifacts typically were present in the resulting image.

SUMMARY OF THE INVENTION

According to one aspect of the invention, an image is captured into a video signal comprised of individual pixels by means of an array sensor with color stripes. When processing the signal from the sensor, the system first interprets the highest frequencies of the signal as an upper sideband of the I color component in such a way now described that doubles the recoverable bandwidth of color detail.

From the upper sideband of the signal, the corresponding lower color sideband is predicted and its effect is then subtracted from the luminance component, from which, in turn, an image is generated. The resulting image thereby produced is thus enhanced in sharpness while at the same time exhibiting a reduction in artifacts.

In a preferred embodiment, color is demodulated from such a striped array sensor signal wherein the step is included of demodulating the predominant I color vector from the color carrier utilizing an asymmetric sideband filter. This, in effect, extends the upper sideband more than the lower sideband, therefore creating the asymmetric sideband filter.

More particularly, in a preferred embodiment, frequency folding is employed to obtain a purer Y component of the captured video image. The raw signal is limited to the natural Nyquist frequency, but then sampled at twice the Nyquist frequency to generate the Y component. The sampling frequency is twice the color carrier frequency and is phrase aligned to the Q component, thereby aliasing the frequencies above the color carrier back to the lower frequencies. Due to the phase alignment, such aliasing cancels the lower sideband of the strong I component, thereby removing the induced artifacts from the I component in the Y component. The aliases of the smaller Q component do, however, add constructively, doubling the induced artifacts from the Q component in the Y component. However because Q component hues are rare in nature, double the Q artifacts are usually much less noticeable than the single I plus Q artifacts together of the prior art.

The resulting Q component is further low-pass filtered to remove the Q component around the color carrier frequency. The optimal Y component is then subtracted from a second copy of the captured video signal, thereby leaving the lower sideband of the I component that was previously subsumed in the stronger Y component. This residue comprising the lower sideband of the I component is thereafter demodulated to provide a wide bandwidth I component. Effectively, frequencies in the upper sideband are interpreted as I whereby Q components are falsely aliased to I. However, the effective color mismatch is slight because the Q component hues are relatively rare in nature. In exchange, substantially twice the color detail is achieved in the majority of rendered colors, including fleshtones.

Accordingly, from the foregoing, one of the objects of the invention was to provide a technique in the image processing art for affecting sharper images with fewer artifacts from a single color mosaic sensor color imaging system. Another object of the invention was to provide a system and method which would more fully utilize the entire spatial frequency information from the sensor while at the same time providing an essentially linear response.

These and other objects are achieved by the subject invention, which may be understood with reference to the following description in greater detail in conjunction with the attached figures wherein:

DETAILED DESCRIPTION OF THE PREFERRED EMBODIMENT

Figure 4:
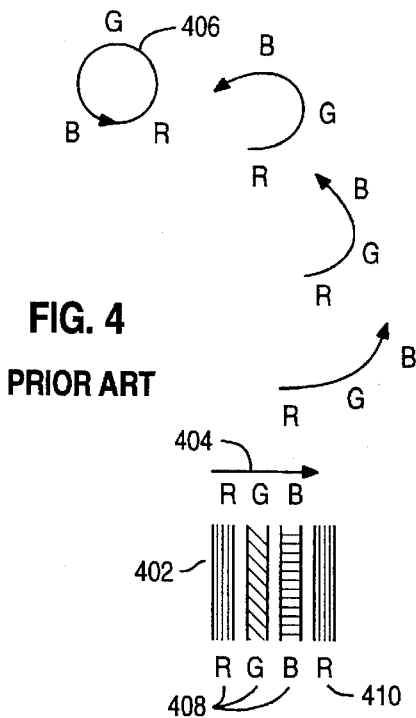
FIG. 4 illustrates the concept of a color circle.
Figure 3:
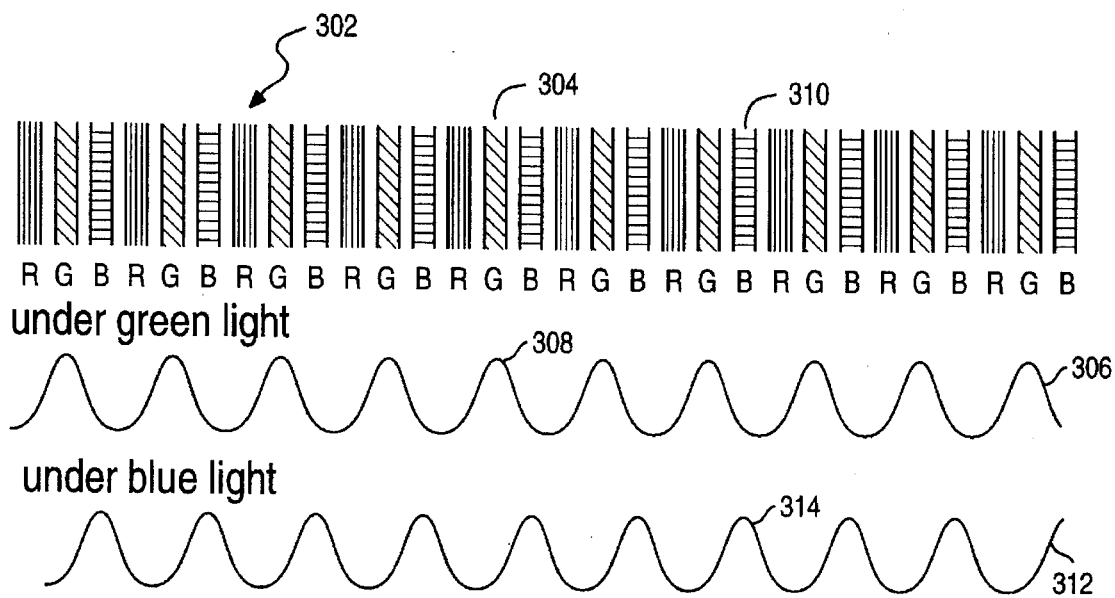
FIG. 3 illustrates output of scanned line Y when specific colors of light impinge on the sensor resulting in a defined frequency of 1.0 in the output signal.

Referring now to FIG. 3, when the array 302 is scanning pure green light as per the previous discussion, an output signal 306 will be generated at a frequency 1.0. In like manner, when the array is scanning blue light, another output signal 312 will be generated also at frequency 1.0. However, a comparison of signals 306 and 312 indicate that there will be a phase difference between the two output signal. Referring to FIG. 4, if it is imagined that the sequence of red, green and blue (R, G, B) stripes 402 recurse to the next red strip 410 and are "bent" into a circle 406 (as shown by the sequence between line 404 and circle 406, the signal stimulated by green light may be seen to be represented by a vector pointing to the green angle of circle 406, represented in FIG. 5 by vector 502.

Figure 5:
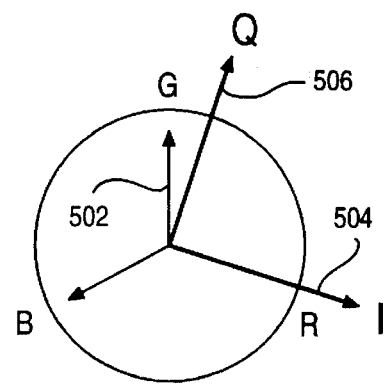
FIG. 5 is a schematic illustration depicting the direction of I and Q vectors within the color circle.

Referring now to FIG. 5, two vectors are of particular interest, namely the I vector 504 and the Q vector 506. Observation, such as in watching an NTSC television broadcast on a vector scope or the like, will reveal that many images of the world are comprised primarily of I components with very little presence of the Q component. In addition, because the colored filters comprising the stripes 402 of FIG. 4 are often pastelized, or less than totally pure in order to pass more light, they tend to blend green into red and blue, and vice versa, thereby further attenuating the Q, 506 from the raw signal. The predominant angle of the raw signal from the array sensor may be defined as I, 504. This angle of I may be shown to be close, although not identical, to the NTSC angle.

Figure 1:
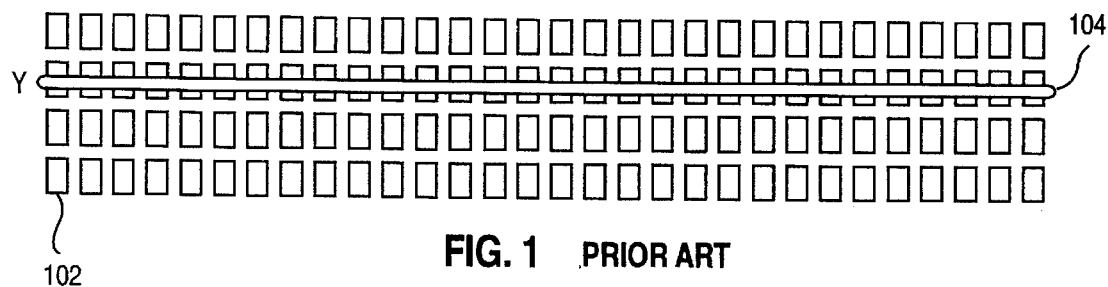
FIG. 1 depicts an array sensor pattern with a scan line Y highlighted.
Figure 2:
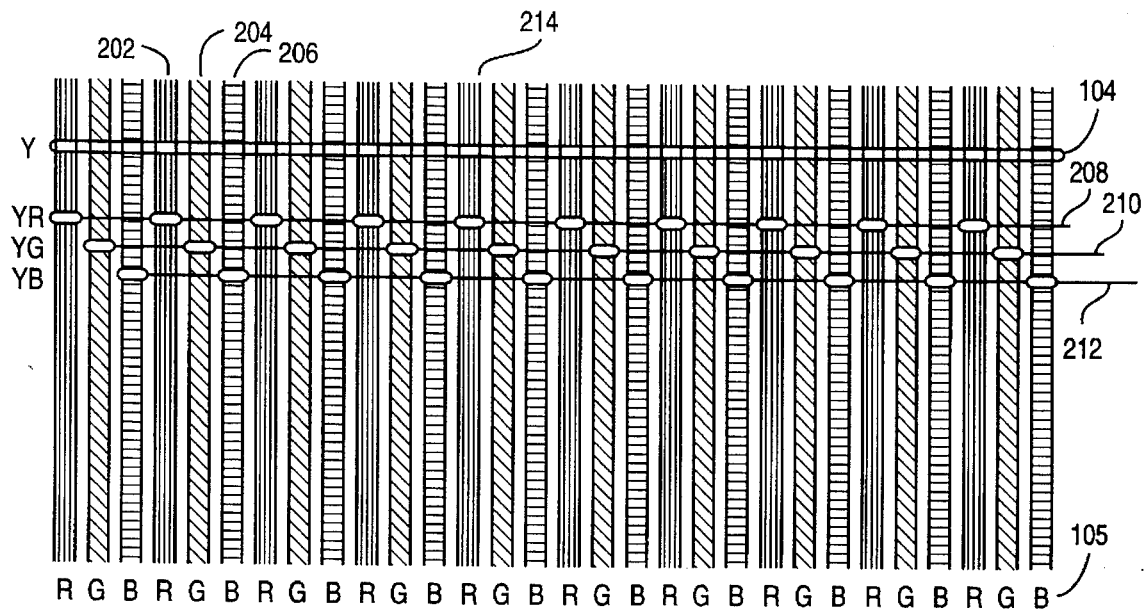
FIG. 2 illustrates a color stripe pattern with one scan line Y highlighted and three color scan lines highlighted.
Figure 6:
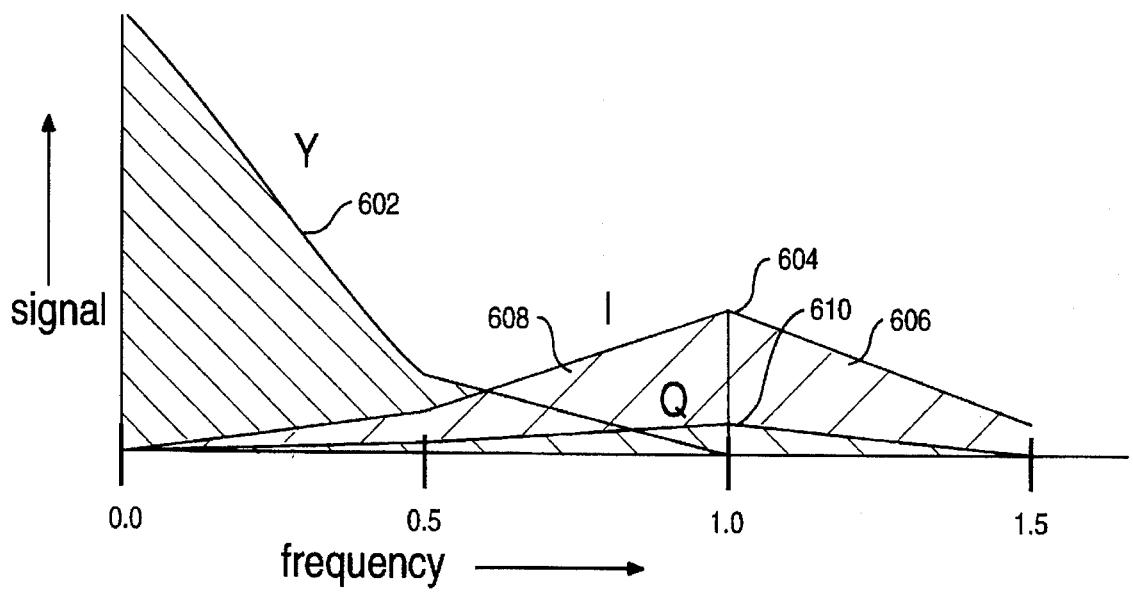
FIG. 6 is a representative plot of the Y, I, and Q spatial frequency content of a signal derived from a sensor with color stripes when stimulated by a typical image.

Turning now to FIG. 6, depicted therein is a figure plotting the spatial frequency spectrum of a scan line 104 of FIG. 2 from a sensor array under the colored stripes 214, with signal strength appearing in the ordinant and frequency along the abscissa axes. The spectrum depicted therein illustrates allocations in terms of I, 604, Q, 610, and the monochrome luminance component Y, 602.

The three aforementioned components I, Q, and Y appear to have substantially equal bandwidths because they arise from the same imaging processes, although the magnitudes of their signals differ. FIG. 6 is intended to illustrate subjectively what the magnitudes of an average of a number of real life photographs might appear as.

It will be noted that the I, 604 and Q, 610 coincide, however they are distinguished by different phases as hereinbefore noted. It will be further noted that the I and Q functions exhibit a double sideband about the carrier frequency 612 of 1.0, e.g., they occupy the frequency spectrum twice. Thus, the two signals 604, 610 together fill twice the spectrum needed for one, and "conservation of information", thus holds. In order to distinguish phase, both sidebands are required. Additional background information on the foregoing may be provided in well known treatises on communication theory and NTSC theory.

Continuing with FIG. 6, except for the phase distinction enabled by matching sidebands of the I and Q spectra, all frequency overlaps create a quandary regarding interpretation. Such quandaries may be illustrated by the numerous artifacts well known in the art which are typically induced as an NTSC television decode attempts to separate overlapping color and luminance signals.

As in the prior art, the lower sideband 608 from approximately 1.0 to 0.75, and the upper sideband 606 extending from 1.0 to 1.25 combine to yield a 0.50 bandwidth for both I and Q together, or 0.25 for each individually. The frequencies from 0.0 to 0.75 are interpreted as Y information, and overlap creates the artifacts.

It is a feature of the invention to employ the frequencies nominally from 1.25 to 1.5 in order to sharpen color detail and suppress artifacts. Because the corresponding frequencies in the lower sideband 608 are dominated by Y, 602, phase detection is generally not feasible. However, under the assumption that most of the color signal is I, as previously explained, the activity from 1.25 to 1.5 may be assumed to be essentially corresponding to the I color signal. Thus, the bandwidth of the I channel, and therefore the bandwidth of most of the color, doubles to 0.5. Furthermore, by assuming the I phase on these high frequencies, the lower sideband can be reliably predicted and subtracted out, thereby reducing contamination between color and those frequencies interpreted as luminance Y between nominally 0.5 and 0.75.

Figure 7:
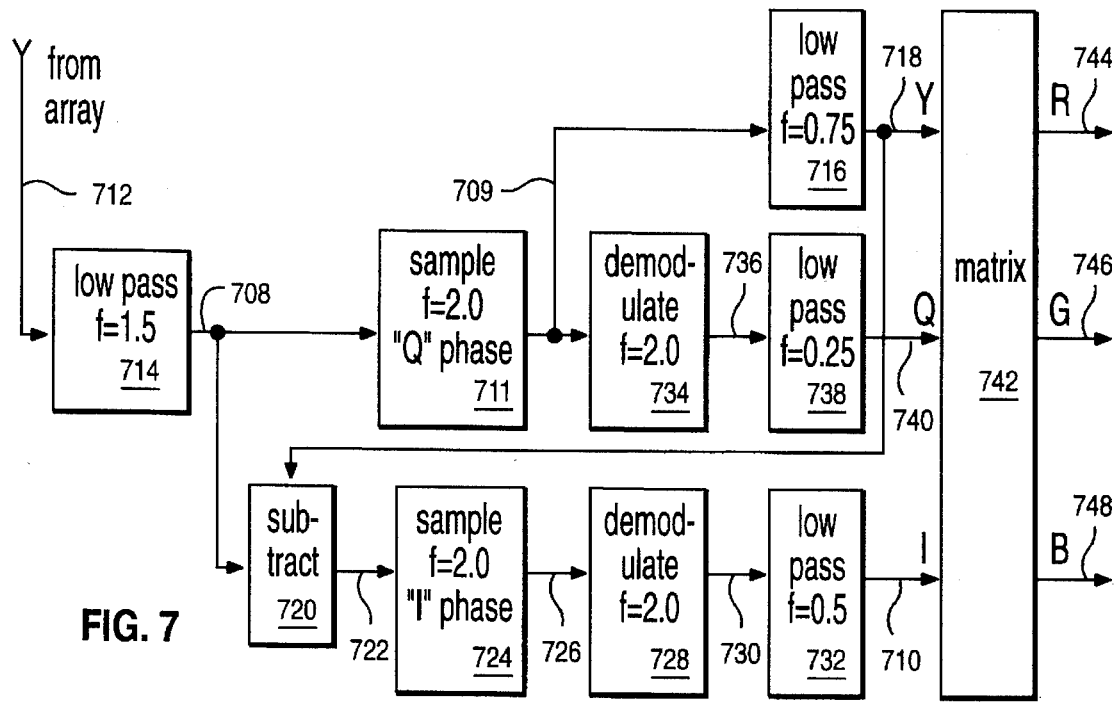
FIG. 7 is a block diagram of a preferred embodiment of the invention.

Referring now to FIG. 7, depicted therein is an embodiment of a system implementing the foregoing inventive concepts which utilizes frequency folding to obtain a purer Y component. It will be recalled that a raw signal 712 from a scan line 104 of FIG. 2 will first have been generated from the array under the color stripes 214. This raw signal 712 is limited by an appropriate digital low pass filter 714 set at the Nyquist frequency of the array, i.e., 1.5. The output of the low pass filter, 708, is then routed through a sampler 711 having a sampling frequency that is twice the color carrier frequency (e.g. F=2.0) and further is phase-aligned to the Q component, i.e, sampled at those instants that a Q signal would be maximum positive and negative. This sampling is performed by sampling the digital signal at the instants specified by the sampling frequency and specifically does not include any low pass filtering beyond that specified for block 714, thereby intentionally introducing some aliasing (because the sampling frequency specified is less than twice the cutoff frequency of low pass filter block 714). This sampling aliases the frequencies above the color carrier back to the lower frequencies. Because of such phase alignment to the Q signal, this aliasing cancels the lower sideband of the strong I component, thereby removing the induced artifacts from the I component in the devised Y component 709. Unfortunately, however, the aliases of the smaller Q component add constructively, thereby doubling the induced artifacts from the Q component in the Y component. The output 709 of the samples is thereafter routed through an appropriate low pass filter 716 so as to remove the Q component around the color carrier frequency of 1.0, such low pass filter for example nominally having a cutoff frequency of 0.75. The resulting output 718 of the low pass filter 716 may thereby be recognized as the Y component of the input signal 712 after the hereinbefore described video processing.

Figure 8:
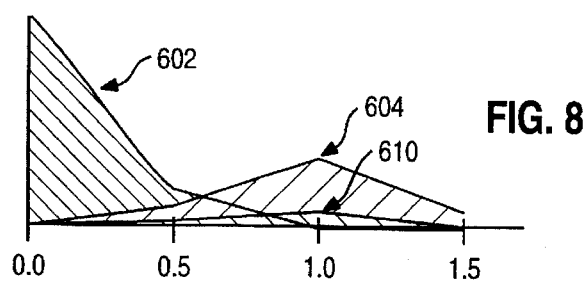
FIG. 8 is a spatial frequency spectrum plot of the signal content in FIG. 7 at location 708.
Figure 9:
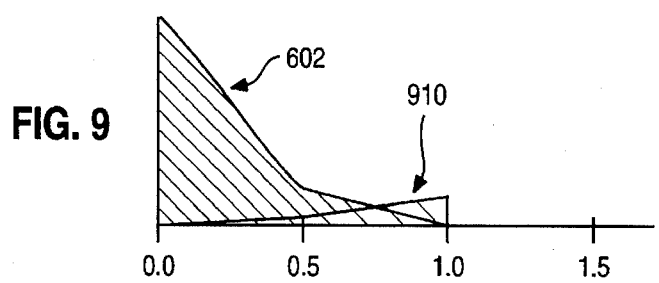
FIG. 9 is a spatial frequency spectrum plot of the signal content in FIG. 7 at location 709.

With reference to FIGS. 8 and 9, the effect of the foregoing resampling is visualized graphically in the frequency domain.

Referring now to FIG. 8, the spectrum at point 708 in FIG. 7 is portrayed. The Y channel component 602, the I channel component 604, and the Q channel component 610 are passed by the low pass filter 714 to produce the spectrum comparable with FIG. 6.

Referring now to FIG. 9, the spectrum at point 709 in FIG. 7 is portrayed the upper sideband 606 in FIG. 6 of the I component 604 has been folded over the lower sideband 608 to cause cancellation. A more intuitive, but less precise, explanation is that because the sampling occurred at the peaks of the Q wave, and since the Q and I components are 90 deg. out of phase, therefore the sampling occurs at those instants when the I component wave passes zero as it oscillates, and therefore the I component does not appear in the sampled signal portrayed in FIG. 9. The magnitude of the Q component 910 is however doubled. This later will be discussed further.

The output signal 718 from the first low pass filter 716, is then functionally routed to a subtracting function 720, along with the output 708 from the low pass filter 714. This subtracting function 720 is employed to subtract this best Y signal 718 from the second copy of the incoming signal 712 available at 708, thereby leaving the lower sideband of the I component that previously was in the stronger Y component. This signal 722 is thereafter routed through a sampler 724 which again, in like manner to the sampler 711, has a sampling frequency of twice the color carrier frequency but is phase-aligned to the I component. The output 726 from this sampler is thereafter routed to a demodulator 728 in order to provide a wide bandwidth I component at output 730 which, after routing through a low pass filter 732 having a cutoff frequency of 0.5, appears as I, the output signal 710. A demodulator inverts the sign of each alternate sample, thus taking a signal, such as the I signal, that oscillates plus and minus, and making the result of a constant polarity.

Figure 10:
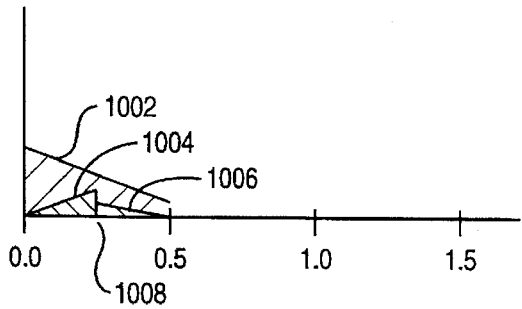
FIG. 10 is spatial frequency spectrum plot of the signal content in FIG. 7 at location 710.

Referring now to FIG. 10, the effect of this processing is seen in the spectral domain to contain primarily the decoded I component 1002. There is also a residue of the Y signal 1004 that grows with frequency. Unlike in the prior art where the interference with Y continues to grow, in the present invention it is substantially attenuated above a frequency 1008, allowing the I channel to be accepted with a wider bandwidth for more color detail. A characteristic of this method is that the attenuation of Y, 1004, is at the expense of a small crosstalk from Q, 1006, which in average is much less objectionable.

Continuing with FIG. 7, it will be noted that effectively the freqencies in the upper sideband are interpreted as I, so that any Q component gets falsely aliased to I, thereby giving rise to slight miscolors around the edges of green and purple objects. However, such problems will easily be deemed to be minor in comparison to the benefit of substantial increase on the order of twice the color detail in a large majority of colors, including fleshtones.

The signal is sampled by the Q phased sampler 711, demonstrated by the previously discussed demodulator 734, and the output 736 then routed through a low pass filter 738 with cutoff frequency of nominally 0.25. The output of this low pass filter is thereby recognized as the Q component 740. (see also FIG. 7). These Y, Q, and I components 718, 710, and 740, respectively, are input to a matrix 742 conventionally known in the art whereby the subsequent familiar R, G, and B components 744, 746 and 748 are thereby formed.

Referring again to FIG. 9, note that, as mentioned before, the magnitude of infestation by the Q channel into the Y by the present invention is doubled compared to the prior art methods as a cost of eliminating the I channel interference.

Because the magnitude of Q is almost always much less than the magnitude of the I, it follows that Q plus Q is almost always less than I plus Q. More precisely, the interference in luminance is the sum of the squares of aliased I and Q, and therefore it is suboptimum to totally cancel the I while doubling the Q. For example, assuming that I is four times stronger than Q, the optimum cancellation leaves 22% of the I, not 0%, and increases Q to 188%, not 200%. In order to implement the foregoing, the upper sidebands may desirably be attenuated to 88% prior to the Q phase sampling at reference numeral 711 of FIG. 7 which is utilized to generate the folded Y.

In yet another embodiment and refinement of the foregoing, each image area may be examined to determine locally the phase and relative magnitudes of the I and Q components. In effect, this adaptive method may result in making the high frequency color detail match the phase of proximal low frequency color. All of the foregoing description holds except that rather than selecting I and Q for an average of all scenes, as done in NTSC television, this adaptive method determines a local $I^1$ "inphase" to the predominant color component in a region of the image, and a $Q^1$ that is "quadrature" to that local predominant color.

To find $I^1$, the signal at 708 of FIG. 7 is bandpass filtered at F=1.0 with a narrow bandwidth of nominally 0.1 to isolate the color carrier. The absolute value of the resultant signal exhibits peaks that define the $I^1$ sampling frequency. The sampling frequency of block 711 $Q^1$ is counterphase, occurring between the $I^1$ samples. In addition, the phase of $I^1$ is measured relative to I, and the coefficients in the color matrix 742 are adjusted coincidentally using standard color space conversion techniques.

More particularly, the isolated color carrier may be notched with a rejection bandwidth of nominally 0.01 right at 1.0 to remove overall color bias in the scene, and the absolute value signal resonated by passing through a bandpass filter with nominal bandwidth of 0.1 centered at 2.0 prior to sensing the peaks defining the $I^1$ sampling frequency.

Figure 11:
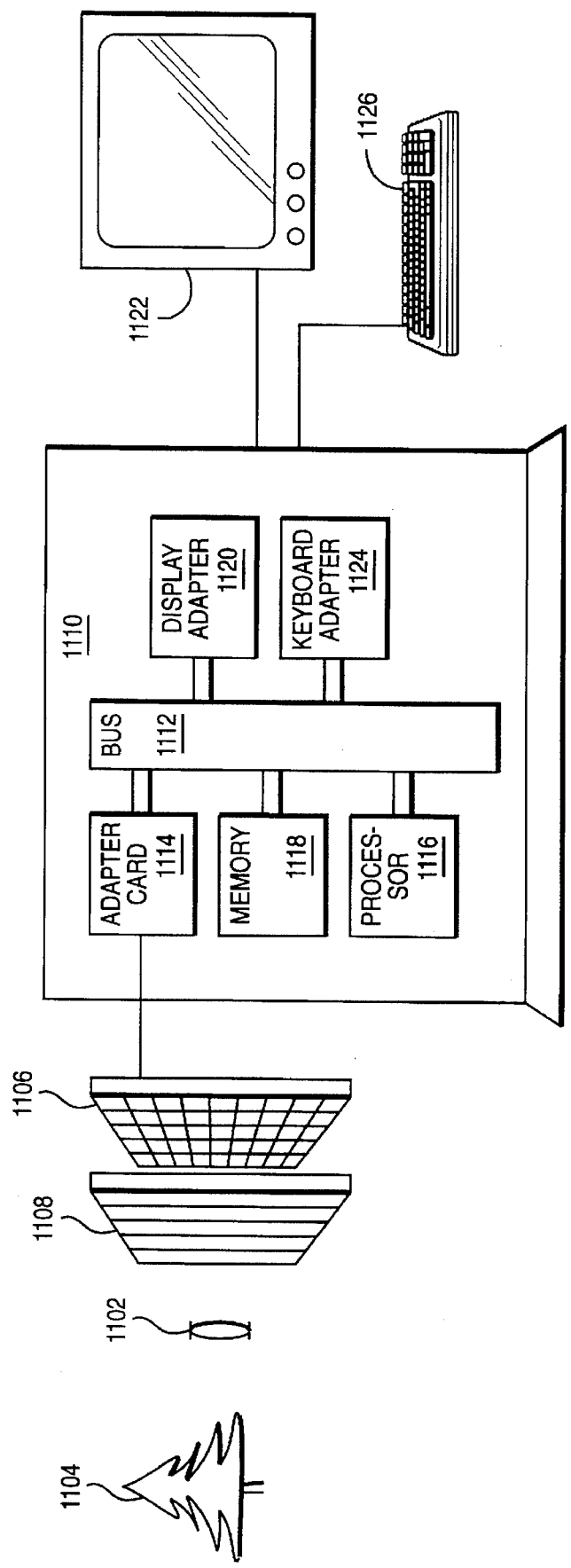
FIG. 11 is a block diagram of a system implementing the invention and depicting the components, including the array generating the array sensor pattern.

FIG. 11 portrays a system for practicing the present invention. A lens 1102 focuses an image from an object 1104 onto a sensor array 1106. A color filter array 1108 is disposed in front of the sensor array to cast colored shadows onto the sensor array 1106 in a pattern set by the color filter array 1108.

A computer 1110, such as a PS/2 (Trademark of International Business Machines Corporation) personal computer manufactured by IBM contains a bus 112 to transmit data. An adapter card 1114 enables data from the sensor array 1106 to be digitized and placed on the bus 1112. A processor 1116 is also attached to the bus to receive data from the array over the bus, and interpret the data according to the teachings of this invention. Memory 1118 is also attached to the bus 1112 to store control steps for the processor 1116 and to store data interpreted by the processor. A display adapter card 1120 receives image data generated by the processor 1116 and converts it into an electrical form compatible with a monitor display 1122. A keyboard adapter 1124 and keyboard 1126 enable an operator to enter programs and control the operations of the computer.

While the invention has been shown and described with reference to particular embodiments thereof, it will be understood by those skilled in the art that the foregoing and other changes in form and detail may be made therein without departing from the spirit and scope of the invention.

I claim:

1. A method for demodulating color from a striped array sensor signal comprising:

capturing an image with a striped array sensor in a video signal having upper and lower sidebands and a color carrier with a predominant I color vector; and demodulating said I color vector from said color carrier with an asymmetric sideband filter.

2. The method of claim 1 wherein said demodulating said I color vector includes filtering said video signal with said asymmetric sideband filter, said filter passing more of said upper sideband relative to said lower sideband.

3. A method for processing a striped array signal having a color carrier frequency (Fcc) and Y, Q, I components from an array defining a Nyquist frequency Fn, comprising the steps of:

low pass filtering said array signal to generate a first signal;

sampling said first signal to generate a second signal;

low pass filtering said second signal to generate a modified Y component of said array signal;

demodulating said second signal to generate a third signal;

low pass filtering said third signal to generate a modified Q component of said array signal;

generating a fourth signal comprised of the difference between said first signal and said modified Y component;

sampling said fourth signal to generate samples comprising a fifth signal;

demodulating said fifth signal to generate a sixth signal; and low pass filtering said sixth signal to generate a modified I component of said array signal.

4. The method of claim 3 further including:

executing a matrix transformation on said modified Y, Q, and I components to generate corresponding R, G, and B components, respectively, of said array signal.

5. The method of claim 3 wherein the cutoff frequency Fc of said low pass filtering said array signal is set at said Nyquist frequency Fn of said array.

6. The method of claim 5 wherein said cutoff frequency Fc is set nominally to 1.5 Fcc.

7. The method of claim 3 wherein said sampling said first signal is at a nominal frequency of 2 Fcc.

8. The method of claim 3 wherein said sampling said first signal is at a nominal frequency less than 2 Fcc.

9. The method of claim 8 wherein said sampling aliases frequencies above said Fcc to lower frequencies.

10. The method of claim 3 wherein samples from said sampling said first signal are phase aligned to said Q component.

11. The method of claim 3 wherein said low pass filtering said second signal is with a low pass filter set to remove said Q component nominally around the frequency Fcc to generate the modified Y component of said array signal.

12. The method of claim 11 wherein the cutoff frequency of said low pass filtering said second signal is nominally within the range of 0.5 Fcc to Fcc.

13. The method of claim 12 wherein said demodulating said second signal is at a nominal frequency of 2 Fcc.

14. The method of claim 13 wherein said demodulating said second signal alters samples of said second signal to generate said third signal having adjacent samples of identical Q polarity.

15. The method of claim 14 wherein said demodulating said second signal inverts the sign of alternate samples of said second signal.

16. The method of claim 3 wherein the center frequency of said low pass filtering said third signal is nominally less than 0.5 Fcc.

17. The method of claim 16 wherein said sampling said fourth signal is at a nominal frequency of 2 Fcc.

18. The method of claim 17 wherein said samples comprising said fifth signal are phase aligned to said I component.

19. The method of claim 18 wherein said demodulating said fifth signal is at a nominal frequency 2 Fcc.

20. The method of claim 19 wherein said demodulating said fifth signal alters samples of said fifth signal to generate said sixth signal having adjacent samples of identical I polarity.

21. The method of claim 20 wherein said demodulating said fifth signal inverts the sign of alternate samples of said fifth signal.

22. The method of claim 21 wherein the center frequency of said low pass filtering said sixth signal is nominally 0.5 Fcc.

23. An apparatus for demodulating color from a striped array sensor signal generated from a striped array sensor comprising:

means for capturing an image with said striped array sensor in a video signal having upper and lower sidebands and a color carrier with a predominant I color vector; and means interconnected to said means for capturing for demodulating said I color vector from said color carrier with an asymmetric sideband filter.

24. The apparatus of claim 23 wherein said means for demodulating said I color vector includes means for filtering said video signal with said asymmetric sideband filter, said filter passing more of said upper sideband relative to said lower sideband.

25. Apparatus for processing a striped array signal having a color carrier frequency (Fcc=1) and Y, Q, I components from an array defining a Nyquist frequency Fn, comprising:

means for low pass filtering said array signal to generate a first signal;

means for sampling said first signal to generate a second signal;

means for low pass filtering said second signal to generate a modified Y component of said array signal;

means for demodulating said second signal to generate a third signal;

means for low pass filtering said third signal to generate a modified Q component of said array signal;

means for generating a fourth signal comprised of the difference between said first signal and said modified Y component;

means for sampling said fourth signal to generate samples comprising a fifth signal;

means for demodulating said fifth signal to generate a sixth signal; and means for low pass filtering said sixth signal to generate a modified I component of said array signal.

26. The apparatus of claim 25 further including:

means for executing a matrix transformation on said modified Y, Q, and I components to generate corresponding R, G, and B components, respectively, of said array signal.

27. The apparatus of claim 25 wherein the cutoff frequency Fc of said means for low pass filtering said array signal is set at said Nyquist frequency Fn of said array.

28. The apparatus of claim 27 wherein said cutoff frequency Fc is set nominally to 1.5 Fcc.

29. The apparatus of claim 25 wherein said means for sampling said first signal is at a nominal frequency of 2 Fcc.

30. The apparatus of claim 25 wherein said means for sampling said first signal is at a nominal frequency less than 2 Fcc.

31. The apparatus of claim 30 wherein said sampling aliases frequencies above said Fcc to lower frequencies.

32. The apparatus of claim 25 wherein samples from said means for sampling said first signal are phase aligned to said Q component.

33. The apparatus of claim 25 wherein said means for low pass filtering said second signal is with a low pass filter set to remove said Q component nominally around the frequency Fcc to generate the modified Y component of said array signal.

34. The apparatus of claim 33 wherein the cutoff frequency of said low pass filtering said second signal is nominally within the range of 0.5 Fcc to Fcc.

35. The apparatus of claim 34 wherein said means for demodulating said second signal is at a nominal frequency of 2 Fcc.

36. The apparatus of claim 35 wherein said means for demodulating said second signal alters samples of said second signal to generate said third signal having adjacent samples of identical Q polarity.

37. The apparatus of claim 36 wherein said means for demodulating said second signal inverts the sign of alternate samples of said second signal.

38. The apparatus of claim 25 wherein the center frequency of said low pass filtering said third signal is nominally less than 0.5 Fcc.

39. The apparatus of claim 38 wherein said means for sampling said fourth signal is at a nominal frequency of 2 Fcc.

40. The apparatus of claim 39 wherein said samples from said means for sampling said fourth signal are phase aligned to said I component.

41. The apparatus of claim 40 wherein said means for demodulating said fifth signal is at a nominal frequency of 2 Fcc.

42. The apparatus of claim 41 wherein said means for demodulating said fifth signal alters samples of said fifth signal to generate said sixth signal having adjacent samples of identical I polarity.

43. The apparatus of claim 42 wherein said means for demodulating said fifth signal inverts the sign of alternate samples of said fifth signal.

44. The apparatus of claim 43 wherein the center frequency of said means for low pass filtering said sixth signal is nominally 0.5 Fcc.

* * * * *